United States Patent
Mackovitch (10) Patent No.: US 10,509,767 B2
(45) Date of Patent: Dec. 17, 2019

(54) SYSTEMS AND METHODS FOR MANAGING SNAPSHOTS OF A FILE SYSTEM VOLUME

(71) Applicant: Apple Inc., Cupertino, CA (US)

(72) Inventor: Michael S. Mackovitch, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 15/377,986

(22) Filed: Dec. 13, 2016

(65) Prior Publication Data

US 2017/0357659 A1   Dec. 14, 2017

Related U.S. Application Data (60) Provisional application No. 62/349,082, filed on Jun. 12, 2016.

(51) Int. Cl.
| | |
|---|---|
| *G06F 16/11* | (2019.01) |
| *G06F 11/14* | (2006.01) |
| *G06F 16/16* | (2019.01) |
| *G06F 16/18* | (2019.01) |
| *G06F 16/22* | (2019.01) |

(52) U.S. Cl.
CPC ........ *G06F 16/128* (2019.01); *G06F 11/1446* (2013.01); *G06F 16/162* (2019.01); *G06F 16/1865* (2019.01); *G06F 16/2246* (2019.01); *G06F 2201/84* (2013.01)

(58) Field of Classification Search
CPC .. G06F 16/128; G06F 16/162; G06F 16/2246; G06F 16/1865; G06F 11/1446

USPC ......................................................... 707/639
See application file for complete search history.

(56) References Cited

U.S. PATENT DOCUMENTS

| | | | |
|---|---|---|---|
| 6,038,639 A | 3/2000 | O'Brien et al. | |
| 7,882,071 B2* | 2/2011 | Fachan | G06F 16/174 707/649 |
| 8,131,723 B2* | 3/2012 | Sim-Tang | G06F 11/1435 707/737 |
| 8,356,013 B2* | 1/2013 | Fachan | G06F 16/174 707/648 |
| 8,412,688 B1 | 4/2013 | Armangau et al. | |
| 8,832,026 B1* | 9/2014 | Kazar | G06F 16/128 707/639 |
| 2006/0206536 A1* | 9/2006 | Sawdon | G06F 11/1435 |

(Continued)

*Primary Examiner* — Robert W Beausoliel, Jr.
*Assistant Examiner* — Arthur Ganger
(74) *Attorney, Agent, or Firm* — Dickinson Wright RLLP (57) ABSTRACT

The embodiments set forth techniques for generating snapshots of file system volumes without requiring the implementation of reference counts. A file system can manage snapshot identifiers (IDs) within an object map that corresponds to the file system volume, where each snapshot ID represents a different existing snapshot of the file system volume. A new snapshot can be generated simply by (1) establishing a new snapshot ID based on a current transaction ID managed for the file system volume, and (2) closing the current transaction ID and generating a new current transaction ID. In turn, the new current transaction ID is assigned as a transaction ID within mapping entries that are established/updated after the snapshot is established. In this manner, the transaction ID assigned to each mapping entry can be analyzed against the snapshot IDs to determine the snapshots (if any) to which the mapping entry corresponds.

20 Claims, 8 Drawing Sheets

(56) References Cited

U.S. PATENT DOCUMENTS

| | | |
|---|---|---|
| 2014/0025651 A1 | 1/2014 | Schreter |
| 2014/0156601 A1 | 6/2014 | Strunk et al. |
| 2014/0317352 A1 | 10/2014 | Kleen |
| 2015/0227564 A1* | 8/2015 | Bachar ................ G06F 16/2237 707/649 |
| 2015/0286695 A1* | 10/2015 | Kadayam ............ G06F 11/1448 707/639 |
| 2016/0077920 A1* | 3/2016 | Regni ..................... G06F 16/27 707/649 |

* cited by examiner

*FIG. 7*

SYSTEMS AND METHODS FOR MANAGING SNAPSHOTS OF A FILE SYSTEM VOLUME

CROSS-REFERENCE TO RELATED APPLICATION

The present application claims the benefit of U.S. Provisional Application No. 62/349,082, entitled "SYSTEMS AND METHODS FOR MANAGING SNAPSHOTS OF A FILE SYSTEM VOLUME" filed Jun. 12, 2016, the content of which is incorporated herein by reference in its entirety for all purposes.

FIELD

The described embodiments set forth techniques for managing one or more snapshots of a file system volume of a computing device.

BACKGROUND

Snapshots of states of a file system can be generated to enable a user to access the file system at previous states or restore the file system to previous states. Conventionally, a file system can be represented through tree structures (e.g., B-Trees) having nodes. In some approaches, the file system can utilize reference counts to track whether the nodes are referenced by existing snapshots (and therefore should remain intact). However, such practices can be time-consuming and wasteful of computational resources as the file system grows increasingly complex over time. Accordingly, there is a need for improved techniques for generating snapshots of a file system.

SUMMARY

The embodiments described herein set forth techniques for generating snapshots of file systems without requiring the implementation of reference counts. According to some embodiments, a file system can be configured to manage snapshot identifiers (IDs) within an object map that corresponds to the file system—in particular, a file system volume within the file system—where each snapshot ID represents a different existing snapshot of the file system volume. According to some embodiments, the file system can be configured to maintain a current transaction ID on which the snapshot IDs are based. In particular, the current transaction ID can be assigned to mapping entries within the object map when they are modified within/added to the object map. According to some embodiments, a new snapshot can be generated simply by establishing a new snapshot ID based on the current transaction ID, where, in turn, the current transaction ID is closed, and a new current transaction ID having an updated value (e.g., increased value) is generated. In this manner, the transaction ID assigned to each mapping entry can be analyzed against the snapshot IDs to determine the snapshots (if any) to which the mapping entry corresponds, an originating snapshot associated with the mapping entry, and the like.

According to some embodiments, a method for establishing a new snapshot of a file system volume of a computing device can include the steps of: (1) receiving a request to generate the new snapshot, (2) identifying a current transaction ID associated with the file system, (3) generating a new snapshot ID for the new snapshot based on the current transaction ID, (4) preventing the current transaction ID from being associated with subsequent changes to the file system volume, and (5) generating a new current transaction ID that temporally exceeds the new snapshot ID, wherein the subsequent changes are associated with the new current transaction ID.

As described in greater detail herein, the method can further include carrying out steps for managing different data structures (e.g., an object map and a primary data structure) associated with the file system volume, where the data structures enable the generation, the modification, and the deletion of various elements that enable the techniques to be implemented. According to some embodiments, these elements can include mapping entries within the object map, nodes within the primary data structure, snapshot IDs, and other elements that collectively enable the snapshots to be implemented without requiring the implementation/management of reference counts.

Other embodiments include a non-transitory computer readable medium configured to store instructions that, when executed by a processor, cause the processor to implement any of the techniques set forth herein. Further embodiments include a computing device that is configured to implement the various techniques set forth herein.

This Summary is provided merely for purposes of summarizing some example embodiments to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments

BRIEF DESCRIPTION OF THE DRAWINGS

The included drawings are for illustrative purposes and serve only to provide examples of possible structures and arrangements for the disclosed inventive apparatuses and methods for their application to computing devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for generating snapshots of file system volumes without maintaining reference counts. To provide this functionality for a given file system volume, a file system—e.g., a management entity of the file system—can be configured to manage (1) a primary data structure of the file system volume, and (2) an object map of the file system volume. According to some embodiments, the primary data structure can be used to maintain the overall organization of records included in the file system volume. For example, the primary data structure can be implemented as an organized data structure (e.g., a B-Tree) that includes nodes that are interrelated to one another and hold information about records of the file system volume.

According to some embodiments, the object map is an auxiliary data structure to the primary data structure, and the object map includes a collection of mapping entries. According to some embodiments, the object map can be used to virtualize the manner in which the different nodes of the primary data structure can be referenced. For example, each mapping entry can include a key/value pair that associates the mapping entry with (1) a node within the primary data structure, (2) a transaction identifier ID (based on a current transaction ID), (3) a physical address associated with the node. Each mapping entry can also be configured to include flags for storing additional information, e.g., information that indicates when the mapping entry represents a deletion of a node within the primary data structure. According to some embodiments, the file system can be configured to take action when a change is made to a node within the primary data structure, which can involve modifying one or more mapping entries within the object map in accordance with the change being made to the node.

As noted above, the file system can be configured to manage one or more snapshot IDs within the object map of the file system volume, where each snapshot ID represents a different existing snapshot of the file system. As previously noted herein, the file system can be configured to maintain a current transaction ID on which the snapshot IDs are based. According to some embodiments, a new snapshot can be generated simply by establishing a new snapshot ID for the file system volume based on the current transaction ID, whereupon the current transaction ID is closed, and a new current transaction ID is generated. Importantly, this approach obviates the need to maintain reference counts for determining whether a version of a node in the primary data structure must be preserved. In particular, the transaction IDs/snapshot IDs can be used to determine whether a node is (1) captured in a previous snapshot of the file system volume, (2) captured in a live view of the file system volume, or (3) is not captured in a previous snapshot/the live view of the file system (and can therefore be deleted).

Accordingly, the embodiments described herein set forth techniques for generating new snapshots and managing existing snapshots of a file system of a computing device. A more detailed discussion of these techniques is set forth below and described in conjunction with FIGS. 1-7, which illustrate detailed diagrams of systems and methods that can be used to implement these techniques.

Figure 1:
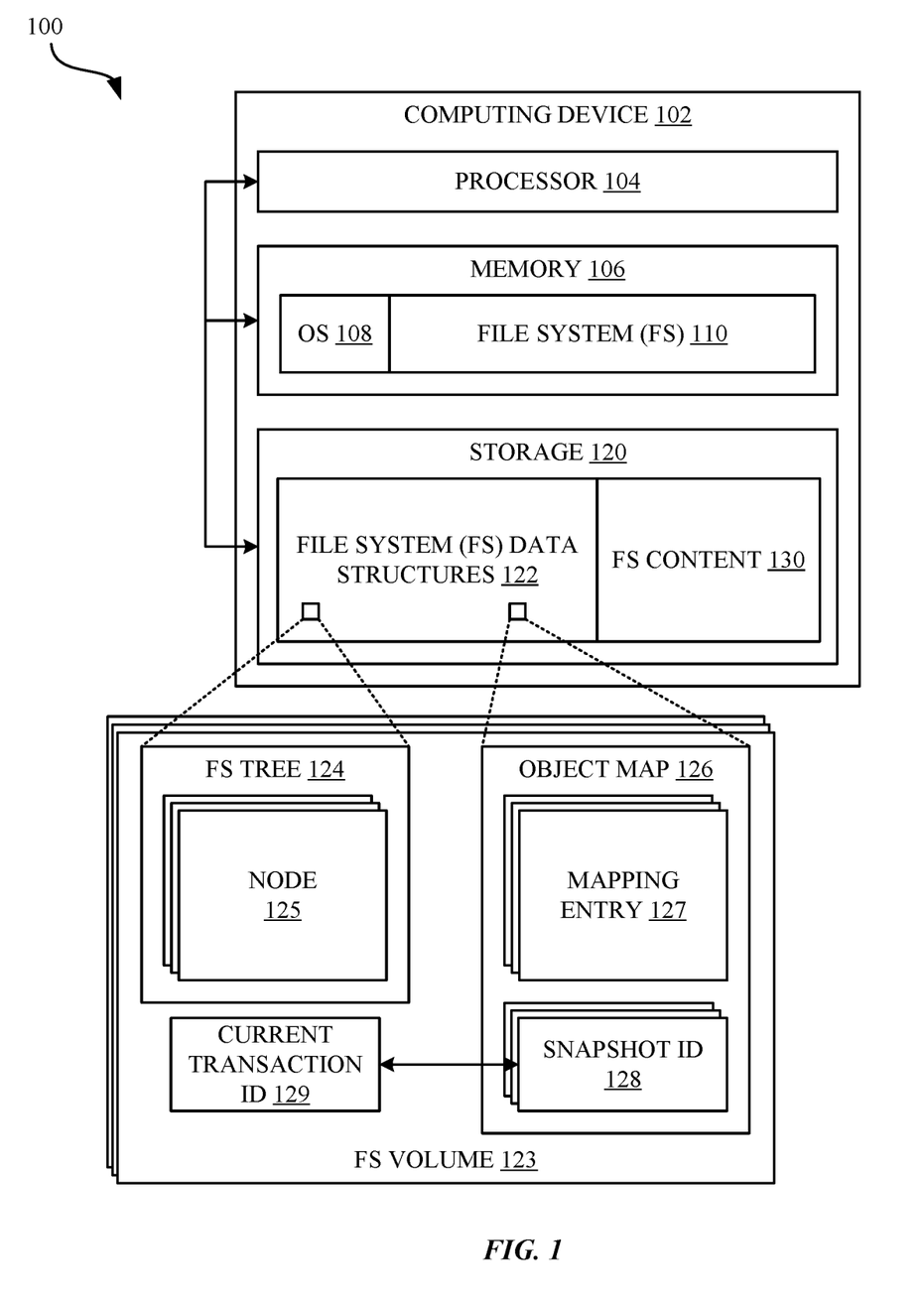
FIG. 1 illustrates a block diagram of different components of a computing device configured to implement the various techniques described herein, according to some embodiments.

FIG. 1 illustrates a block diagram 100 of different components of a computing device 102 that is configured to implement the various techniques described herein, according to some embodiments. More specifically, FIG. 1 illustrates a high-level overview of the computing device 102, which, as shown, can include a processor 104, a memory 106, and a storage 120. According to some embodiments, the processor 104 can be configured to work in conjunction with the memory 106 and the storage 120 to enable the computing device 102 to operate in accordance with this disclosure. For example, the processor 104 can be configured to load an operating system (OS) 108 from the storage 120 into the memory 106 for execution, where the OS 108 includes a file system 110 that is configured to implement various techniques described herein. Although not illustrated in FIG. 1, it is understood that the OS 108 can be configured to enable a variety of processes to run on the computing device 102, e.g., OS daemons, native OS applications, user applications, and the like.

According to some embodiments, and as described in greater detail herein, the file system 110 can represent logic/information for implementing the techniques described herein. For example, the file system 110 can be configured to implement a number of file system volumes 123 that each represent a separate and distinct file system within the computing device 102. According to some embodiments, the one or more file system volumes 123 can be configured to utilize the same physical storage space within the storage 120. This beneficially provides enhanced flexibility as each file system volume 123 can consume space within the storage 120 on an as-needed basis. In addition, each file system volume 123 can be configured to enforce particular configurations (e.g., permissions, ownership, encryption schemes, etc.) independent from the configurations of other file system volumes 123 included in the file system 110.

According to some embodiments, and as described in greater detail herein, the file system 110 can be configured to implement a "write-elsewhere" approach. More specifically, when the file system 110 receives a request to modify data, the file system 110 ends up copying the data into a new location within the storage 120 when the data is modified. In turn, the file system 110 can modify the copied data while the original data remains intact. In this manner, the file system 110 is capable of performing crash recovery techniques, e.g., the file system 110 can more reliably revert to a most current version of the file system 110 in the event of a corruption of the file system 110.

According to some embodiments, the storage 120 can represent a storage device that is accessible to the computing device 102, e.g., a hard disk drive, a solid state drive, a mass storage device, a remote storage device, and the like. As shown in FIG. 1, the storage 120 can be configured to include file system data structures 122 for each file system volume 123. According to some embodiments, the file system data structures 122 represent abstractions/organized hierarchies of the data (e.g., file system content 130) included in the file system volume 123. According to some embodiments, the file system data structures 122 can include a file system tree 124 that represents a primary data structure used to maintain the overall organization of the file system volume 123. For example, the file system tree 124 can be implemented as an organized data structure (e.g., a B-Tree) that includes nodes 125 that are interrelated to one another and hold information about different records of the file system volume 123. Although it is understood that storing the records in a tree representation that includes one or more nodes 125 enables various operations, e.g., searches, sequential accesses, insertions, deletions, etc., to be carried out in an efficient manner, the embodiments set forth herein are not limited to tree-based data structures, and any data structure can be used to manage the nodes 125.

As shown in FIG. 1, the file system data structures 122 can also include an object map 126 that is an auxiliary data structure to the file system tree 124, where the object map 126 includes mapping entries 127. According to some embodiments, the object map 126 can be used to virtualize the manner in which the different nodes 125 of the file system tree 124 can be referenced. As shown in FIG. 1, a current transaction ID 129 can be managed for a container that includes each file system volume 123, where the current transaction ID 129 is assigned to the mapping entries 127 as nodes 125 are modified/created/deleted. As described in greater detail herein, when a snapshot of the file system volume 123 is generated, a snapshot ID 128 for the file system volume 123 can be based on the current transaction ID 129, whereupon the current transaction ID 129 is closed and the current transaction ID 129 is prevented from being associated with any subsequent changes to the file system volume 123. Subsequently, any changes to the file system volume 123 would be assigned a current transaction ID 129 having an updated value (e.g., an increased value). In this manner, subsequent modifications to the object map 126 are associated with a new transaction ID 129 having an updated (e.g., larger) value, thereby enabling the file system 110 to distinguish how the mapping entries 127 are related to different snapshots (if any) of the file system 123.

Figure 2:
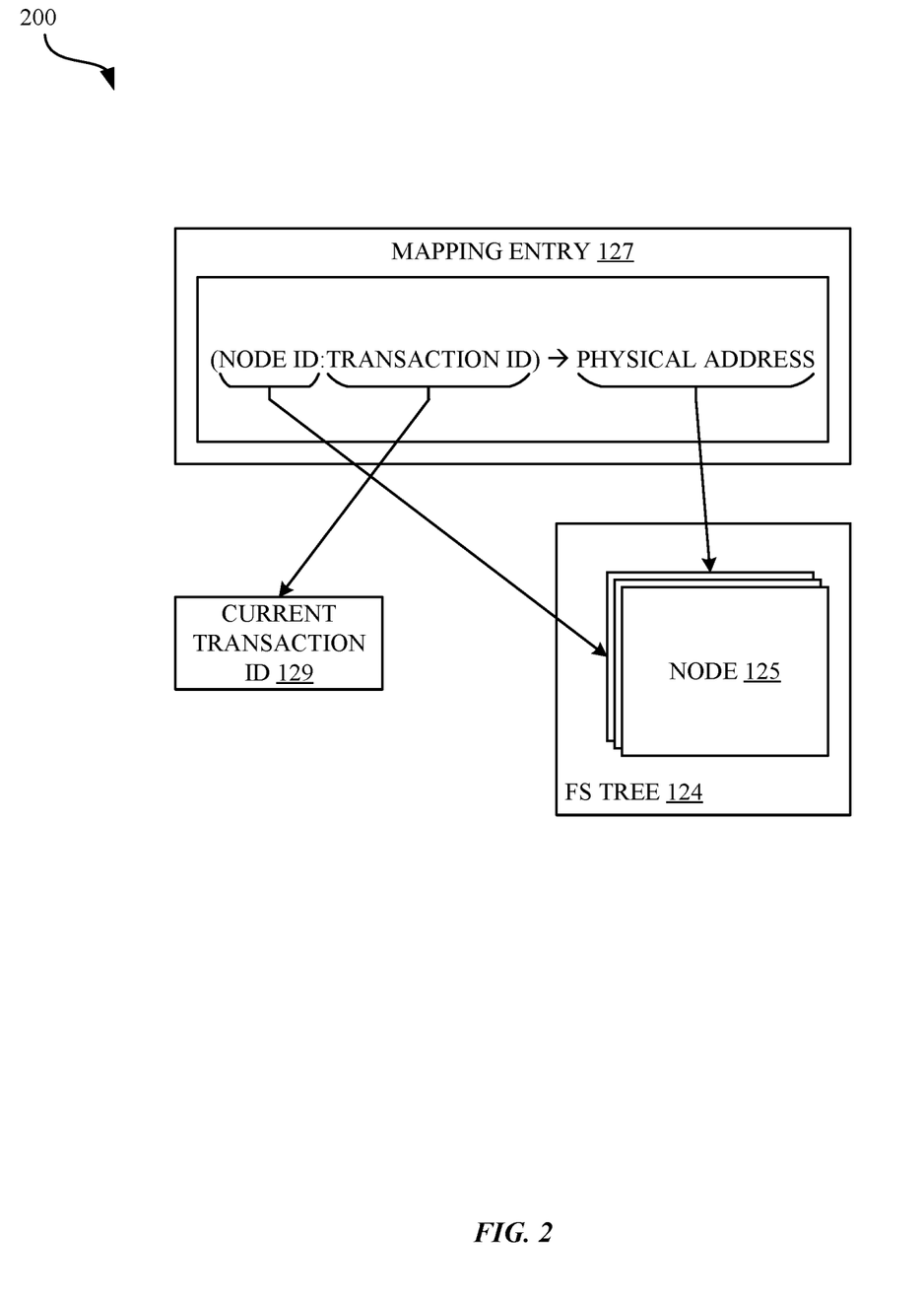
FIG. 2 illustrates a format for a mapping entry of an object map associated with a file system volume, according to some embodiments.

It is noted that the object map 126 can be implemented according to a variety of approaches. For example, FIG. 2 illustrates an example format 200 for a mapping entry 127, according to some embodiments. As shown in FIG. 2, the mapping entry 127 can include a key/value pair that associates the mapping entry 127 with (1) a node 125 within the file system tree 124, (2) a transaction ID (based on the current transaction ID 129 managed for the container), and (3) a physical address associated with a specific version of the object/node 125. It is noted that additional data can be included within each mapping entry 127, e.g., flag data, field data, and so on.

According to some embodiments, and as described below in greater detail in conjunction with FIG. 4, the file system 110 can be configured to receive a notification when a change is made to a node 125, and, in response, update one or more mapping entries 127 within the object map 126 to reflect the change being made to the node 125. It is also noted that, in some cases, generating a new mapping entry 127—specifically, generating the new mapping entry 127 when updating an existing mapping entry 127—can cause the removal of the existing mapping entry 127 when the existing mapping entry 127 is not associated with an intact snapshot. Again, a more detailed description is provided below in conjunction with FIG. 4.

Referring back now to FIG. 1, and as previously set forth herein, the file system 110 can be configured to generate snapshots of file system volumes 123 without maintaining reference counts. To provide this functionality, the file system 110 can be configured to manage one or more snapshot IDs 128 within the object map 126 (of a given file system volume 123), where each snapshot ID 128 represents a different existing snapshot of the file system volume 123. According to some embodiments, the current transaction ID 129 for the file system volume 123 can be established at the time the file system volume 123 is formed. For example, the current transaction ID 129 can be set to a value of "1", such that each mapping entry 127 established after the file system volume 123 is formed takes on the current transaction ID 129 value of "1" as a transaction ID. At some time after the file system volume 123 is formed, a snapshot of the file system volume 123 can be generated simply by establishing a new snapshot ID 128 whose value is based on the current transaction ID 129. For example, the new snapshot ID 128 can be set to a value of "1". In turn, the current transaction ID 129 can be closed/eliminated, whereupon a new current transaction ID 129 having an updated value, e.g., "2", is generated. In this manner, mapping entries 127 established subsequent to the new snapshot will take on the new current transaction ID 129 value of "2" as the transaction ID. Accordingly, subsequent snapshots of the file system volume 123 can be established simply by adding additional snapshot IDs 128 (based on the current transaction ID 129) within the object map 126. Again, this approach obviates the need to maintain reference counts for determining whether nodes 125 should remain intact (e.g., when attempting to delete nodes 125 or eliminate snapshots). Instead, the transaction ID assigned to each mapping entry 127 can be analyzed against the snapshot IDs 128 to determine the snapshots (if any) to which the mapping entry 127 corresponds.

According to some embodiments, the file system 110 can be configured to generate a snapshot when a particular condition is met, e.g., particular operations occurring within the file system 110 (e.g., cloning, changes to access permissions, etc.), temporal conditions, locale conditions, connection conditions, activity conditions, and so on. Alternatively, the file system 110 can be configured to receive requests to generate snapshots of the file system volumes 123, e.g., from a user, from a process executing on the computing device 102, from an external entity communicating with the computing device 102, and the like.

Figure 3A:
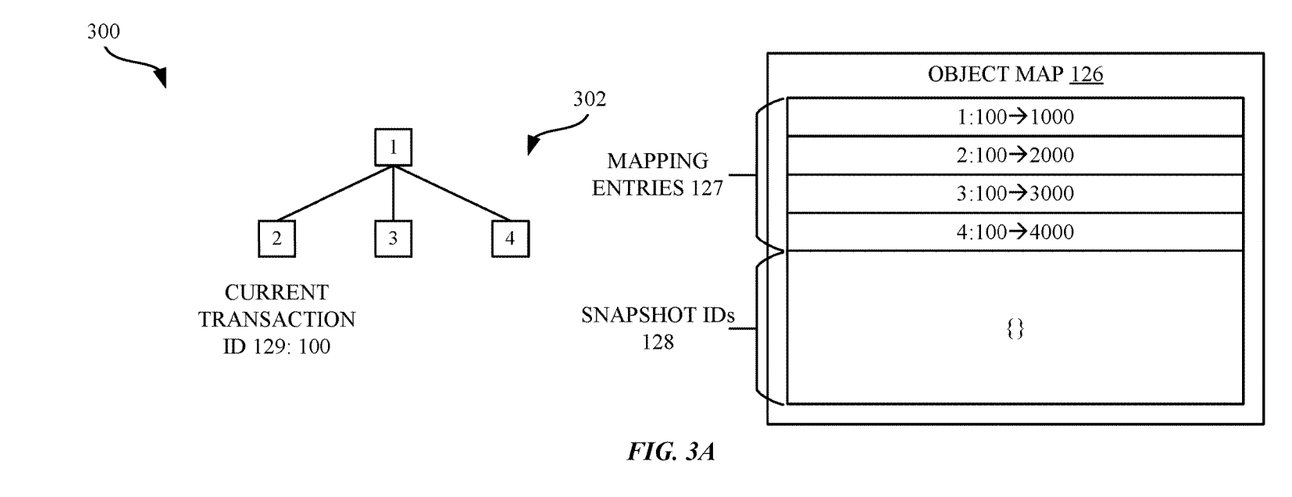
FIGS. 3A-3B illustrate a conceptual diagram of an example scenario that involves generating a snapshot of a file system volume, according to some embodiments.
Figure 3B:
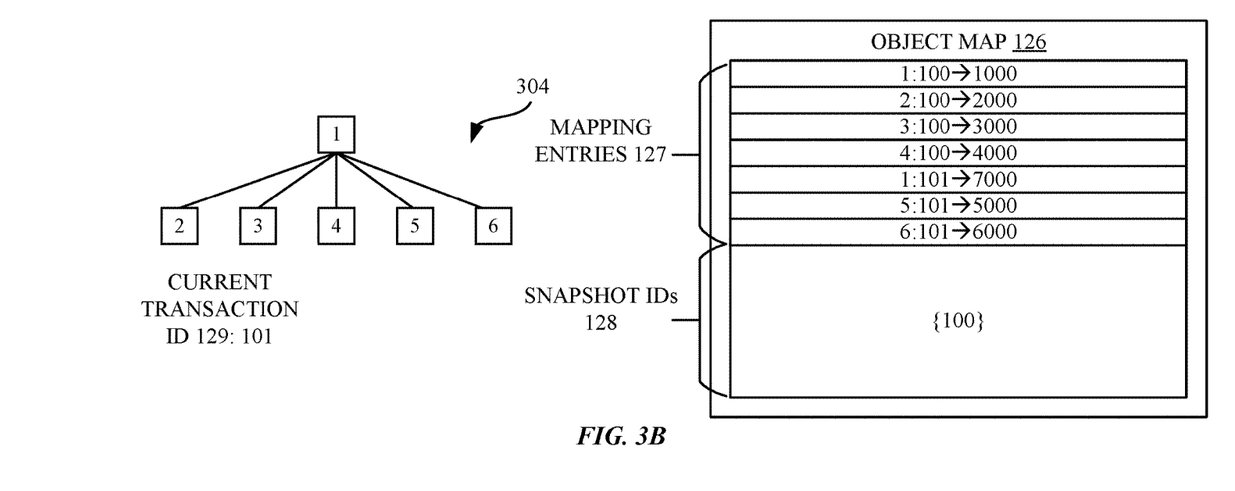

FIGS. 3A-3B illustrate a conceptual diagram of an example scenario 300 that involves generating a snapshot of a file system volume 123, according to some embodiments. Specifically, FIG. 3A illustrates an exemplary B-tree structure 302 of the file system volume 123, where, as shown in FIG. 3A, the exemplary B-tree structure 302 includes four nodes 125: a first node 125 having a node ID of "1", a second node 125 having a node ID of "2", a third node 125 having a node ID of "3", and a fourth node 125 having a node ID of "4". As shown in FIG. 3A, the object map 126 associated with the file system volume 123 includes four respective mapping entries 127 for the four nodes 125 in accordance with the example format illustrated in FIG. 2. For example, each mapping entry 127 references (1) a node ID of a respective node 125 included in the exemplary B-tree structure 302, (2) a transaction ID having a value of "100" that is based on the current transaction ID 129 (having a value of "100", as indicated in FIG. 3A), and (3) an example physical address associated with the respective node 125.

Within the scope of the example shown in FIG. 3A—and, after the four nodes 125 are established within the exemplary B-tree structure 302—the file system 110 generates a new snapshot of the exemplary B-tree structure 302 which causes the value "100" to be added to the snapshot IDs 128 for the object map 126. When the new snapshot ID 128 is generated, the current transaction ID 129 can be closed, and any changes to the file system 110 will be prevented from being associated with the current transaction ID 129. Instead, any changes to the file system 110 can be reflected in a new current transaction ID 129 having a value of "101" in accordance with the prior current transaction ID 129 being closed.

FIG. 3B illustrates the next step of the example scenario 300 after the new snapshot is generated. As shown in FIG. 3B, two new nodes 125 are added to the exemplary B-tree structure 302 to produce an updated exemplary B-tree structure 304: a fifth node 125 having a node ID of "5", and a sixth node 125 having a node ID of "6". As shown in FIG. 3B, the object map 126 associated with the file system volume 123 is updated to include two respective new mapping entries 127 for the two new nodes 125 (again, in accordance with the example format illustrated in FIG. 2). For example, each of the two new mapping entries 127 references (1) the node ID of the respective new node 125 included in the updated exemplary B-tree structure 304, (2) a transaction ID having a value of "101" that is based on the value of the current transaction ID 129 (which was updated to the value of "101"), and (3) an example physical address associated with the respective new node 125. Moreover, and as shown in FIG. 3B, the object map 126 is also updated to include a mapping entry 127 that reflects a change that is made to the node 125 having the node ID of "1", where the transaction ID for the mapping entry 127 is associated with the new current transaction ID 129.

Accordingly, FIGS. 3A-3B set forth an example scenario in which the embodiments set forth herein can be implemented to provide an efficient way for managing snapshots. For example, according to the example illustrated in FIGS. 3A-3B, the file system 110 can establish a new snapshot simply by (1) adding a snapshot ID 128 (based on the current transaction ID 129) to the collection of snapshot IDs 128 included in the object map 126, and (2) closing the current transaction ID 129, and (3) generating a new current transaction ID 129.

Figure 4:
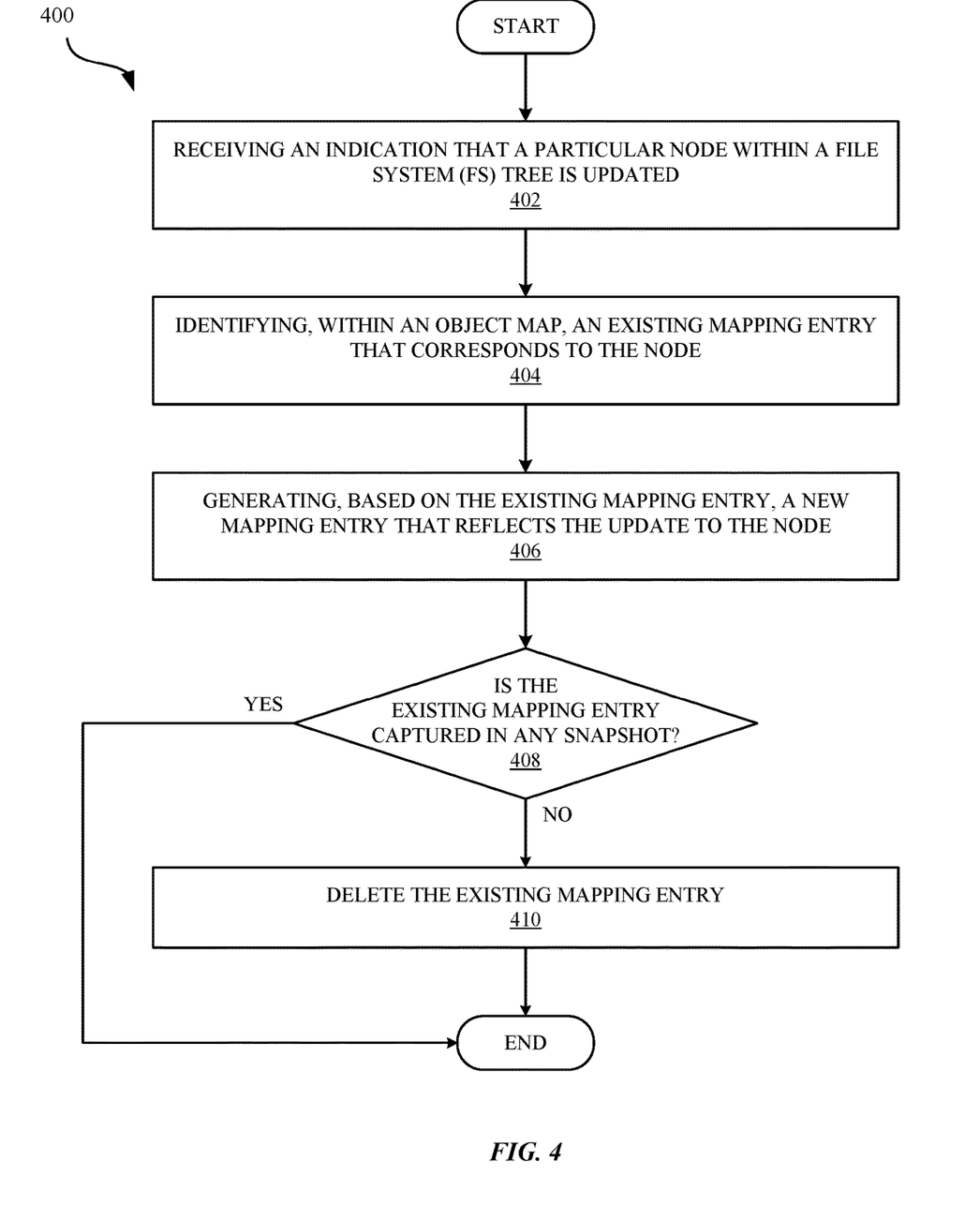
FIG. 4 illustrates a method for updating mapping entries within an object map, according to some embodiments.

FIG. 4 illustrates a method 400 for updating mapping entries 127 within an object map 126 in response to updates made to nodes 125 within a corresponding file system tree 124, according to some embodiments. As shown, the method 400 begins at step 402, where the file system 110 receives an indication that a particular node 125 is updated within the file system tree 124. In some embodiments, the file system 110 can be configured to receive the indication from an entity that manages the file system tree 124 (e.g., a subcomponent of the file system 110). Alternatively, the file system 110 can be configured to perform the update to the node 125, and then correspondingly update the object map 126 according to the remaining steps of the method 400. An update to the particular node 125 can occur, for example, when data associated with the node 125 is updated within the storage 120. At step 404, the file system 110 identifies, within the object map 126, an existing mapping entry 127 that corresponds to the node 125. At step 406, the file system 110 generates, based on the existing mapping entry 127, a new mapping entry 127 that reflects the update to the node 125, which is representative of the write-elsewhere technique described herein.

Next, at step 408, the file system 110 determines whether the existing mapping entry 127 is captured in any snapshot. According to some embodiments, the file system 110 can make this determination by referencing the transaction ID of the existing mapping entry 127 against the snapshot IDs 128 included in the object map 126. For example, when a numbering scheme for the current transaction ID 129 dictates that the current transaction IDs 129 increase in value as new snapshots are generated, e.g., the values 1, 2, 3, and so on, the determination can involve identifying whether the transaction ID of the existing mapping entry 127 is less than the snapshot ID 128 having the largest value among the snapshot IDs 128. Accordingly, if, at step 408, the file system 110 determines that the existing mapping entry 127 is captured in an existing (i.e., intact) snapshot, then the method 400 ends, and the existing mapping entry 127 is not deleted because the existing mapping entry 127 belongs to the intact snapshot (and therefore should be preserved). Otherwise, the method 400 proceeds to step 410, where the file system 110 deletes the existing mapping entry 127, as the existing mapping entry 127 is not associated with any snapshots (and therefore does not need to be preserved).

Figure 5:
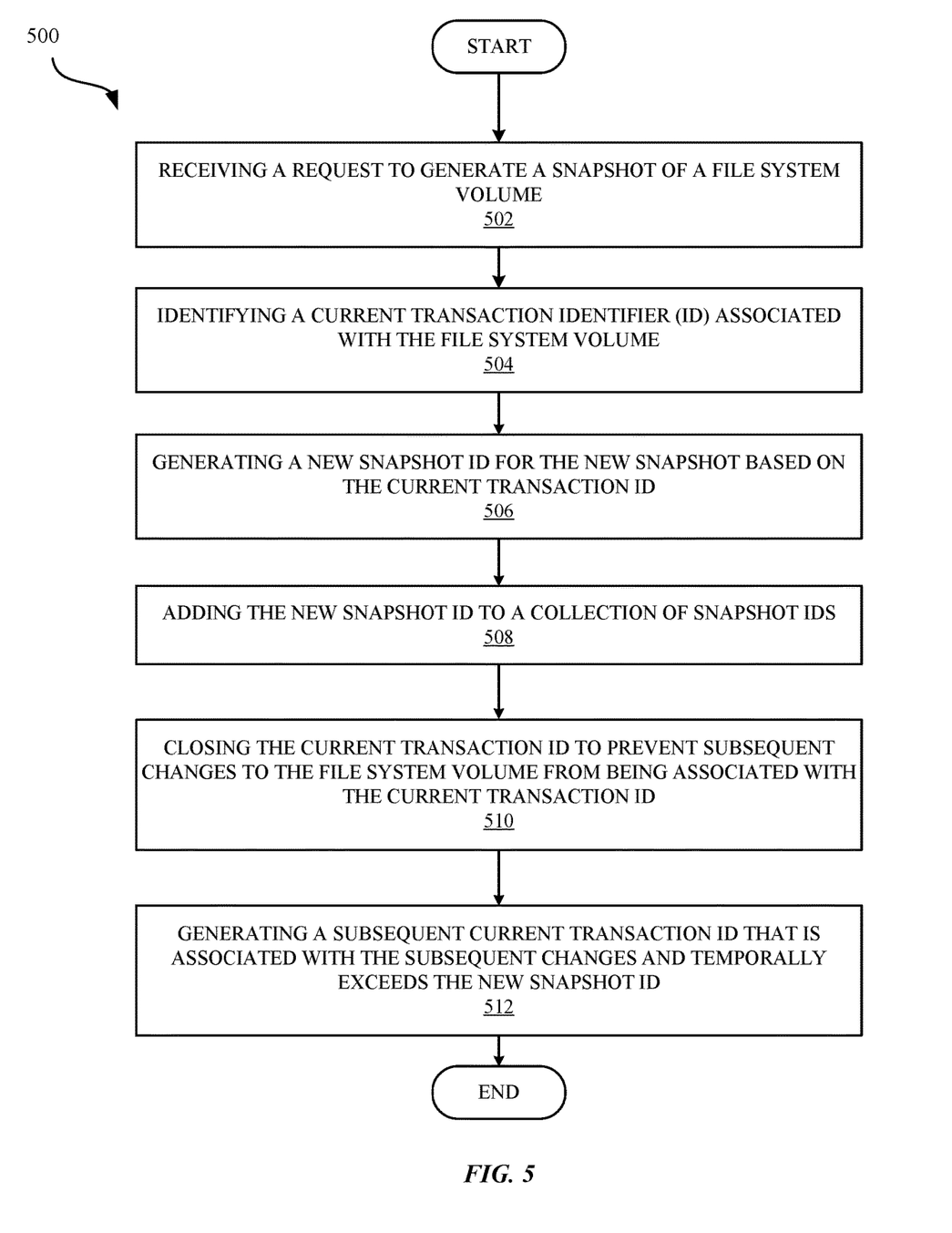
FIG. 5 illustrates a method for generating a snapshot of a file system volume, according to some embodiments.

FIG. 5 illustrates a method 500 for generating a snapshot of a file system volume 123, according to some embodiments. As shown in FIG. 5, the method 500 begins at step 502, where the file system 110 receives a request to generate a snapshot of the current state of the file system volume 123. At step 504, the file system 110 identifies the current transaction ID 129 associated with the file system volume 123. At step 506, the file system 110 generates a new snapshot ID 128 for the new snapshot based on the current transaction ID 129. At step 508, the file system 110 adds the new snapshot ID 128 to the collection of snapshot IDs 128 included in the object map 126. At step 510, the file system 110 can close the current transaction ID 129 to prevent the current transaction ID 129 from being associated with any subsequent changes to the file system volume 123. At step 512, the file system 110 can generate a new current transaction ID 129 in a manner that indicates that the new current transaction ID 129 temporally exceeds the new snapshot ID 128. For example, when an increasing value scheme is implemented, the current transaction ID 129 can be increased by a particular value, e.g., one. In this manner, the (updated) current transaction ID 129, when subsequently assigned to mapping entries 127 within the object map 126, will indicate that those mapping entries 127 were modified/created after the generation of the new snapshot.

Figure 6A:
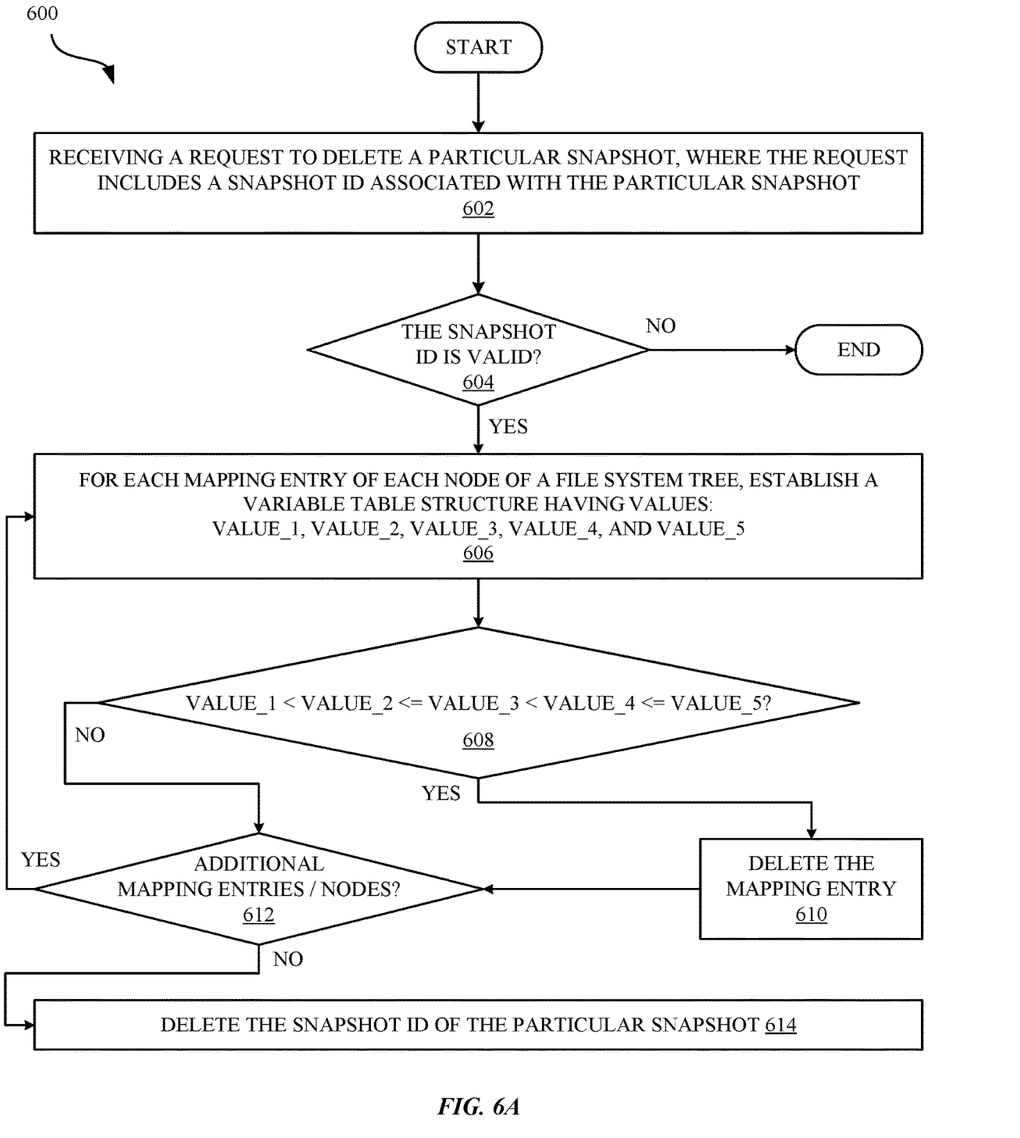
FIG. 6A illustrates a method for deleting snapshots of a file system volume, according to some embodiments.

Additionally, FIG. 6A illustrates a method 600 for deleting snapshots of a file system volume 123, according to some embodiments. As shown in FIG. 6A, the method 600 begins at step 602, where the file system 110 receives a request to delete a particular snapshot of a file system volume 123. According to some embodiments, the request can include a snapshot ID 128 associated with the particular snapshot, and the request can be generated according to a backup schedule, a user command, and the like. At step 604, the file system 110 determines whether the snapshot ID 128 is valid. This can involve, for example, determining whether the snapshot ID 128 is listed in the snapshot IDs 128 maintained within the object map 126 associated with the file system volume 123. If, at step 604, the file system 110 determines that the snapshot ID 128 is not valid, then the method 600 ends as no action should be taken. Otherwise, the method 600 proceeds to step 606.

Next, steps 606-612 involve iterating the mapping entries 127 (in the object map 126) for each node 125 (in the file system tree 124), and, when appropriate, deleting mapping entries 127 that are no longer needed as a result of deleting the particular snapshot. It is noted that steps 606-608 utilize a scheme for the snapshot IDs 128 in which the current transaction ID 129 is increased each time a new snapshot is generated. However, it will be appreciated that the scheme can be modified to implement any organizational scheme that enables the file system 110 to manage the current transaction ID 129/snapshot IDs 128 in accordance with the various techniques described herein.

Figure 6B:
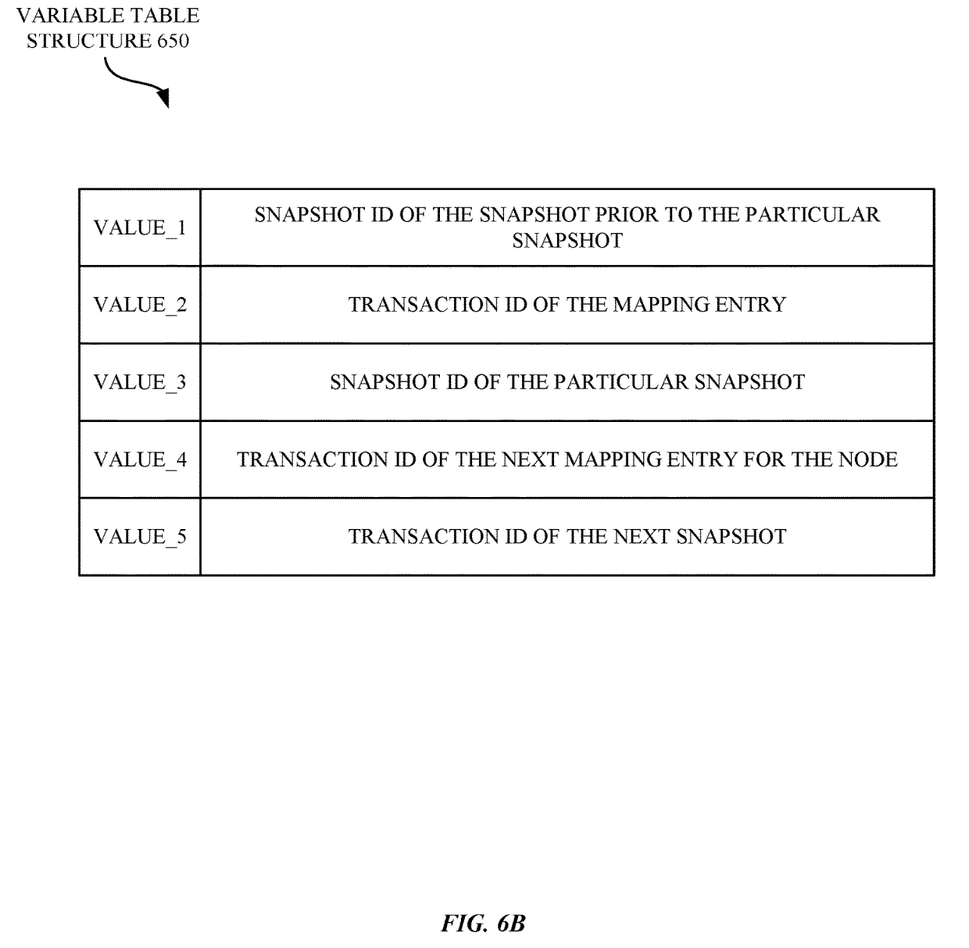
FIG. 6B illustrates a variable table structure for implementing the deletion of the snapshots in accordance with FIG. 6A, according to some embodiments.

As shown in FIG. 6A, step 606 involves parsing the mapping entries 127 for the nodes 125, and establishing assigning different values to five different variables included in the exemplary variable table structure 650 illustrated in FIG. 6B. According to some embodiments, and as shown in FIG. 6B, the variable "VALUE_1" is set as the snapshot ID 128 of the snapshot that was taken prior to the particular snapshot (that is being deleted), the variable "VALUE_2" is set as the transaction ID of the current mapping entry 127 being analyzed, the variable "VALUE_3" is set as the snapshot ID 128 of the particular snapshot (that is being deleted), the variable "VALUE_4" is set as the transaction ID of the next mapping entry 127 for the current node 125 being analyzed, and the variable "VALUE_5" is set as the transaction ID of the snapshot that was taken after the particular snapshot (that is being deleted).

Next, returning back to FIG. 6A, at step 608, the file system 110 determines whether the following condition is true or false: VALUE_1<VALUE_2<=VALUE_3<VALUE_4<=VALUE 5. If, at step 608, the file system 110 determines that condition is true, then the method 600 proceeds to step 610, where the file system 110 deletes the current mapping entry 127 from the object map 126. In turn, the method 600 proceeds to step 612, where the file system 110 determines whether there are any additional mapping entries 127 within the object map 126 that need to be processed through steps 606-612. If, at step 612, the file system 110 determines that additional mapping entries 127 need to be processed, then the method 600 proceeds back to step 606, where the steps 606-612 are carried out against a next mapping entry 127. Otherwise, when the file system 110 has completed its processing the object map 126, the method proceeds to step 614, where the file system 110 deletes the snapshot ID 128 of the particular snapshot, and the method 600 is concluded.

Figure 7:
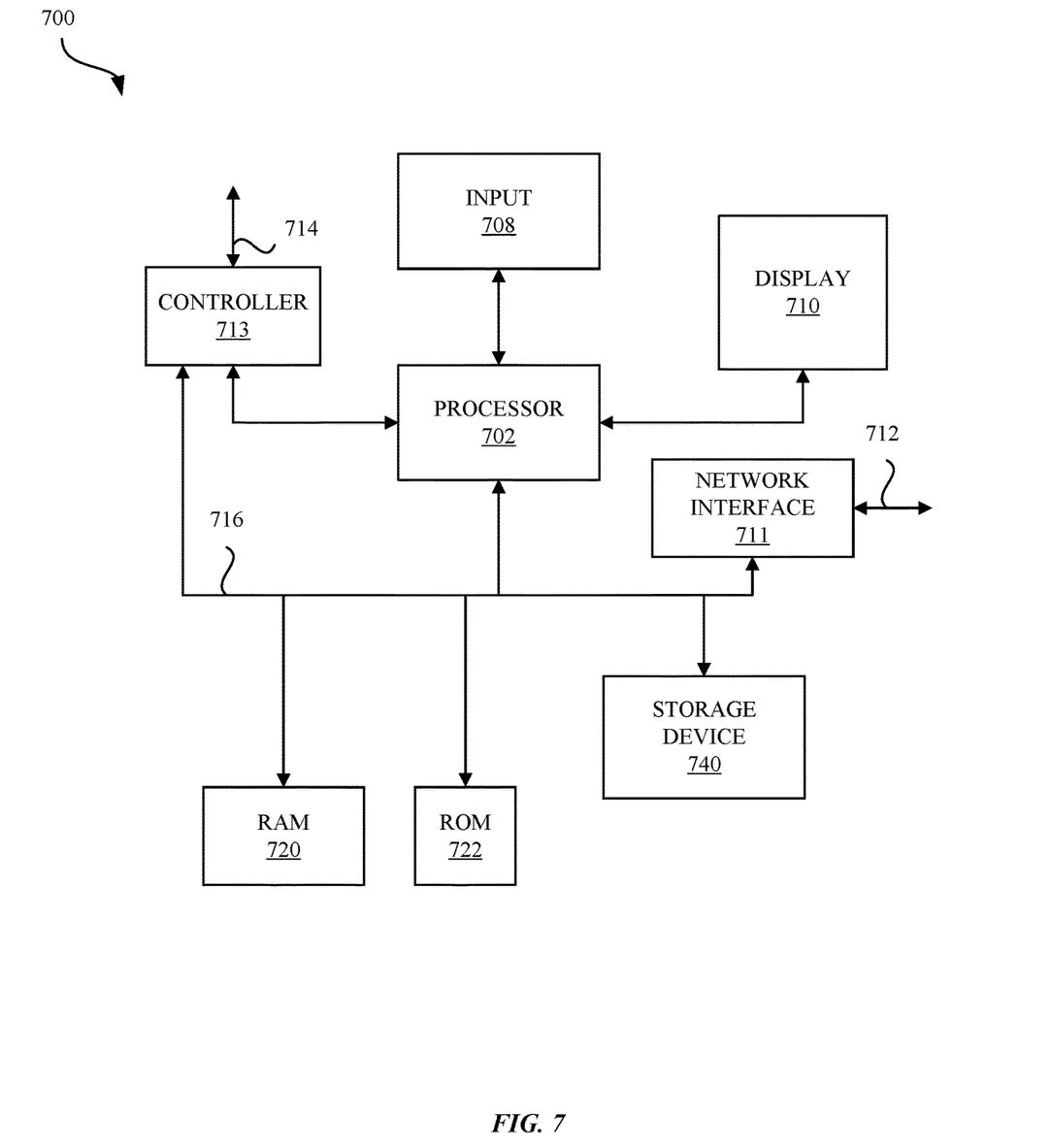
FIG. 7 is a block diagram of a computing device that can represent the components of a computing device or any other suitable device or component for realizing any of the methods, systems, apparatus, and embodiments described herein.

FIG. 7 illustrates a detailed view of a computing device 700 that can be used to implement the various components described herein, according to some embodiments. In particular, the detailed view illustrates various components that can be included in the computing device 102 illustrated in FIG. 1. As shown in FIG. 7, the computing device 700 can include a processor 702 that represents a microprocessor or controller 713 for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or multiple disks (e.g., hard drives). In some embodiments, the storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

EMBODIMENTS

The embodiments set forth a method for establishing a new snapshot of a file system volume of a computing device. According to some embodiments, the method includes the steps of (1) receiving a request to generate the new snapshot, (2) identifying a current transaction identifier (ID) associated with the file system, (3) generating a new snapshot ID for the new snapshot based on the current transaction ID, (4) preventing the current transaction ID from being associated with subsequent changes to the file system volume, and (5) generating a new current transaction ID that temporally exceeds the new snapshot ID, wherein the subsequent changes are associated with the new current transaction ID.

In some embodiments, the file system volume is associated with a mapping data structure having mapping entries for tracking modifications made to the file system volume, and each of the mapping entries includes a key and a value, where: the key is based on: (1) an object ID associated with a particular node of a primary data structure of the file system volume, and (2) a transaction ID, and the value is a physical address associated with the particular node. In some embodiments, the new current transaction ID is assigned as the transaction ID within any mapping entries that change within the mapping data structure subsequent to generating the new snapshot. In some embodiments, changes to the mapping entries occur in response to changes to the file system volume. According to some embodiments, changing an existing mapping entry comprises: (i) generating a new mapping entry based on the existing mapping entry, (ii) updating the new mapping entry to reflect a corresponding change in the file system volume, and (iii) when the transaction ID of the existing mapping entry does not correspond to any snapshot ID associated with the file system volume: deleting the existing mapping entry. According to some embodiments, the steps can further include: adding the new snapshot ID to a plurality of snapshot IDs, wherein each snapshot ID of the plurality of snapshot IDs represents a different snapshot of the file system volume taken at a respective time.

In some embodiments, the new snapshot is established by way of adding the new snapshot ID to the plurality of snapshot IDs. In some embodiments, identifying mapping entries that correspond to a particular snapshot of the plurality of snapshots comprises: identifying a respective snapshot ID associated with the particular snapshot, and identifying any mapping entries whose respective transaction ID is temporally exceeded by the respective snapshot ID. according to some embodiments, the method can further include the steps of (1) receiving a request to delete a specific snapshot, wherein the specific snapshot is associated with a snapshot ID included in the plurality of snapshot IDs, (2) identifying whether any mapping entries within the mapping data structure can be deleted in association with the deletion of the specific snapshot, (3) when at least one mapping entry can be deleted: deleting the at least one mapping entry, and (4) deleting the snapshot ID of the plurality of snapshot IDs.

It is noted that the foregoing method steps can be implemented in any order, and that different dependencies can exist among the various limitations associated with the method steps.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for establishing a new snapshot of a file system volume of a computing device, the method comprising:
   receiving a first request to perform at least one transaction associated with the file system volume;
   identifying a current transaction identifier (ID) associated with the file system volume, wherein the current transaction ID is assigned to all transactions that took place:
      prior to receiving the first request, and
      subsequent to establishing any previous snapshot;
   associating the current transaction ID with the at least one transaction;
   receiving a second request to generate the new snapshot;
   generating a new snapshot ID for the new snapshot based on the current transaction ID;
   preventing the current transaction ID from being associated with subsequent transactions to the file system volume; and
   generating a new current transaction ID that temporally exceeds the new snapshot ID, wherein the subsequent transactions are associated with the new current transaction ID.

2. The method of claim 1, wherein:
   the file system volume is associated with a mapping data structure having mapping entries for tracking modifications made to the file system volume, and
   each of the mapping entries includes a key and a value, wherein:
      the key is based on: (1) an object ID associated with a particular node of a primary data structure of the file system volume, and (2) a transaction ID, and
      the value is a physical address associated with the particular node.

3. The method of claim 2, wherein the new current transaction ID is assigned as the transaction ID within any mapping entries that change within the mapping data structure subsequent to generating the new snapshot.

4. The method of claim 3, wherein changes to the mapping entries occur in response to changes to the file system volume.

5. The method of claim 4, wherein changing an existing mapping entry comprises:
   generating a new mapping entry based on the existing mapping entry;
   updating the new mapping entry to reflect a corresponding change in the file system volume; and
   when the transaction ID of the existing mapping entry does not correspond to any snapshot ID associated with the file system volume:
      deleting the existing mapping entry.

6. The method of claim 3, further comprising:
   adding the new snapshot ID to a plurality of snapshot IDs, wherein each snapshot ID of the plurality of snapshot IDs represents a different snapshot of the file system volume taken at a respective time.

7. The method of claim 6, wherein the new snapshot is established by way of adding the new snapshot ID to the plurality of snapshot IDs.

8. The method of claim 6, wherein identifying mapping entries that correspond to a particular snapshot comprises:
   identifying a respective snapshot ID associated with the particular snapshot, and
   identifying any mapping entries whose respective transaction ID is temporally exceeded by the respective snapshot ID.

9. The method of claim 6, further comprising:
   receiving a third request to delete a specific snapshot, wherein the specific snapshot is associated with a snapshot ID included in the plurality of snapshot IDs;
   identifying whether any mapping entries within the mapping data structure can be deleted in association with deleting the specific snapshot;
   when at least one mapping entry can be deleted:
      deleting the at least one mapping entry; and
      deleting the snapshot ID of the plurality of snapshot IDs.

10. At least one non-transitory computer readable storage medium configured to store instructions that, when executed by at least one processor included in a computing device, cause the computing device to establish a new snapshot of a file system volume at the computing device, by carrying out steps that include:
   receiving a first request to perform at least one transaction associated with the file system volume;

identifying a current transaction identifier (ID) associated with the file system volume, wherein the current transaction ID is assigned to all transactions that took place:
    prior to receiving the first request, and
    subsequent to establishing any previous snapshot;
associating the current transaction ID with the at least one transaction;
receiving a second request to generate the new snapshot;
generating a new snapshot ID for the new snapshot based on the current transaction ID;
preventing the current transaction ID from being associated with subsequent transactions to the file system volume; and
generating a new current transaction ID that temporally exceeds the new snapshot ID, wherein the subsequent transactions are associated with the new current transaction ID.

11. The at least one non-transitory computer readable storage medium of claim 10, wherein:
the file system volume is associated with a mapping data structure having mapping entries for tracking modifications made to the file system volume, and
each of the mapping entries includes a key and a value, wherein:
    the key is based on: (1) an object ID associated with a particular node of a primary data structure of the file system volume, and (2) a transaction ID, and
    the value is a physical address associated with the particular node.

12. The at least one non-transitory computer readable storage medium of claim 11, wherein the new current transaction ID is assigned as the transaction ID within any mapping entries that change within the mapping data structure subsequent to generating the new snapshot.

13. The at least one non-transitory computer readable storage medium of claim 12, wherein changes to the mapping entries occur in response to changes to the file system volume.

14. The at least one non-transitory computer readable storage medium of claim 13, wherein changing an existing mapping entry comprises:
generating a new mapping entry based on the existing mapping entry;
updating the new mapping entry to reflect a corresponding change in the file system volume; and
when the transaction ID of the existing mapping entry does not correspond to any snapshot ID associated with the file system volume:
    deleting the existing mapping entry.

15. The at least one non-transitory computer readable storage medium of claim 12, wherein the steps further include:
adding the new snapshot ID to a plurality of snapshot IDs, wherein each snapshot ID of the plurality of snapshot IDs represents a different snapshot of the file system volume taken at a respective time.

16. The at least one non-transitory computer readable storage medium of claim 15, wherein the new snapshot is established by way of adding the new snapshot ID to the plurality of snapshot IDs.

17. The at least one non-transitory computer readable storage medium of claim 15, wherein identifying mapping entries that correspond to a particular snapshot comprises:
identifying a respective snapshot ID associated with the particular snapshot, and
identifying any mapping entries whose respective transaction ID is temporally exceeded by the respective snapshot ID.

18. The at least one non-transitory computer readable storage medium of claim 15, wherein the steps further include:
receiving a third request to delete a specific snapshot, wherein the specific snapshot is associated with a snapshot ID included in the plurality of snapshot IDs;
identifying whether any mapping entries within the mapping data structure can be deleted in association with deleting the specific snapshot;
when at least one mapping entry can be deleted:
    deleting the at least one mapping entry; and
deleting the snapshot ID of the plurality of snapshot IDs.

19. A computing device configured to establish a new snapshot of a file system volume at the computing device, the computing device comprising:
at least one processor; and
at least one memory configured to store instructions that, when executed by the at least one processor, cause the computing device to:
    receive a first request to perform at least one transaction associated with the file system volume;
    identify a current transaction identifier (ID) associated with the file system volume, wherein the current transaction ID is assigned to all transactions that took place:
        prior to receiving the first request, and
        subsequent to establishing any previous snapshot;
    associate the current transaction ID with the at least one transaction;
    receive a second request to generate the new snapshot;
    generate a new snapshot ID for the new snapshot based on the current transaction ID;
    prevent the current transaction ID from being associated with subsequent transactions to the file system volume; and
    generate a new current transaction ID that temporally exceeds the new snapshot ID, wherein the subsequent transactions are associated with the new current transaction ID.

20. The computing device of claim 19, wherein:
the file system volume is associated with a mapping data structure having mapping entries for tracking modifications made to the file system volume, and
each of the mapping entries includes a key and a value, wherein:
    the key is based on: (1) an object ID associated with a particular node of a primary data structure of the file system volume, and (2) a transaction ID, and
    the value is a physical address associated with the particular node.

* * * * *